(12) United States Patent
Oliver et al.

(10) Patent No.: US 9,063,776 B2
(45) Date of Patent: Jun. 23, 2015

(54) APPLICATION ACTIVATION FRAMEWORK

(75) Inventors: Daniel J. Oliver, Seattle, WA (US);
Benjamin A. Betz, Redmond, WA (US);
Christopher J. Guzak, Kirkland, WA (US); Relja Ivanovic, Seattle, WA (US);
Ramaswamy Krishnan-Chittur, Redmond, WA (US); Brandon H. Paddock, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 784 days.

(21) Appl. No.: 13/118,016

(22) Filed: May 27, 2011

(65) Prior Publication Data

US 2012/0304200 A1     Nov. 29, 2012

(51) Int. Cl.
*G06F 9/44*     (2006.01)
*G06F 3/00*     (2006.01)
*G06F 17/00*    (2006.01)
*G06F 9/48*     (2006.01)

(52) U.S. Cl.
CPC .................................. *G06F 9/4843* (2013.01)

(58) Field of Classification Search
CPC ..... G06F 9/44505; G06F 8/20; G06F 9/4406; G06F 9/4443; G06F 15/177; G06F 8/24; G06F 17/30896; G06F 2209/545; G06F 3/0236; G06F 8/34; G06F 9/44526
See application file for complete search history.

(56) References Cited

U.S. PATENT DOCUMENTS

| | | | |
|---|---|---|---|
| 7,325,032 B2 | 1/2008 | Zuberec et al. | |
| 7,594,225 B2 | 9/2009 | Barr et al. | |
| 7,774,762 B2 | 8/2010 | Rochette et al. | |
| 7,886,018 B2 | 2/2011 | Tseitlin et al. | |
| 2004/0233236 A1 | 11/2004 | Yang | |
| 2004/0237049 A1 * | 11/2004 | Pletcher et al. | 715/760 |
| 2006/0230124 A1 * | 10/2006 | Belfiore et al. | 709/219 |

(Continued)

OTHER PUBLICATIONS

Lee, et al., "A Usability-Pattern-Based Requirements—Analysis Method to Bridge the Gap between User Tasks and Application Features", Retrieved at <<http://ieeexplore.ieee.org/stamp/stamp.jsp?tp=&arnumber=5676277>>, Proceedings of the IEEE 34th Annual Computer Software and Applications Conference (COMPSAC), Jul. 19-23, 2010, pp. 317-326.

(Continued)

*Primary Examiner* — Tuan Dao
(74) *Attorney, Agent, or Firm* — John Jardine; Kate Drakos; Micky Minhas

(57) ABSTRACT

Techniques for application activation are described herein. An operating system (OS) can be configured to incorporate various extension points that are serviceable through contracts defining individual invocations of extensible functionality. The extensible functionality is integrated as part of the OS and controlled by the OS in a centralized manner. However, the specific implementations of the extensible functionally are offloaded to applications using the contracts. For example, the OS can include or otherwise make use of a centralized application activation component that employs an object-oriented approach to invoke applications to perform particular contracts. The application activation component can pass information describing a particular contract to activate a designated application and enable the application to service the contract in the manner specified by the OS. In this way, the manner in which contracts are handled by application code can be managed and coordinated through a centralized application activation component.

17 Claims, 5 Drawing Sheets

(56) References Cited

U.S. PATENT DOCUMENTS

| | | | |
|---|---|---|---|
| 2006/0242124 | A1 | 10/2006 | Fields et al. |
| 2007/0239985 | A1* | 10/2007 | Bernabeu-Auban et al. ... 713/168 |
| 2008/0189680 | A1 | 8/2008 | Brown et al. |
| 2008/0209316 | A1* | 8/2008 | Zandstra ................. 715/700 |
| 2009/0313004 | A1 | 12/2009 | Levi et al. |
| 2010/0083217 | A1 | 4/2010 | Dalal et al. |
| 2010/0100591 | A1 | 4/2010 | Mahaffey et al. |
| 2010/0185902 | A1* | 7/2010 | Fang et al. ................ 714/48 |
| 2010/0235493 | A1* | 9/2010 | Besaw et al. ............. 709/224 |
| 2010/0281400 | A1* | 11/2010 | Forutanpour et al. ...... 715/760 |
| 2011/0137885 | A1* | 6/2011 | Isberg et al. .............. 707/709 |

OTHER PUBLICATIONS

Wulf, et al., "Direct Activation: A Concept to Encourage Tailoring Activities", Retrieved at <<http://citeseerx.ist.psu.edu/viewdoc/download?doi=10.1.1.20.6642&rep=rep1&type=pdf>>, Proceedings of the Behaviour & Information Technology, vol. 20, Issue 04, Jul. 1, 2001, pp. 1-28.

"International Search Report", Mailed Date: Apr. 25, 2012, Application No. PCT/US2011/055515, Filed Date: Oct. 9, 2011, pp. 8. (MS# 333060.02).

"FAQ What are Extensions and Extension Points? -Eclipsepedia", Available at: https://wiki.eclipse.org/FAQ_What_are_extensions_and_extension_points%3F, Jun. 15, 2006, 1 page.

"Component Object Model-Wikipedia, The Free Encyclopedia", Available at: http://en.wikipedia.org/w/index.php?title=Component_Object_Model&oldid=430504910, May 23, 2011, 15 pages.

"Extended European Search Report", EP Application No. 11867024.9, Apr. 10, 2015, 8 pages.

* cited by examiner

APPLICATION ACTIVATION FRAMEWORK

BACKGROUND

Traditionally, applications for a particular computing system are largely autonomous. Although applications take advantage of some operating system features and can be started by the operating system to perform specific tasks for users, the operating system has little or no control over how the applications implement the features or perform the tasks. Moreover, different applications, especially applications associated with different runtime platforms, may individually control aspects like window generation, layout and ordering, color schemes, fonts, and so forth. Accordingly, the traditional, uncoordinated approach to application implementation creates a disjointed "look and feel" that can inhibit users from having an entirely positive user experience with respect to the operating system.

SUMMARY

Techniques for application activation are described herein. An operating system (OS) can be configured to incorporate various extension points that are serviceable through associated contracts (e.g., specifications that govern implementation of functionality represented by the extension points.) The extensible aspects are defined as integrated functionality of the OS and controlled by the OS in a centralized manner. However, the specific implementations of the extensible functionality can be offloaded to applications using the contracts. For example, the OS can include or otherwise make use of a centralized application activation component that employs an object-oriented approach to invoke applications to perform particular contracts. During activation the OS can pass information (e.g., a contract object or other suitable data) regarding a particular contract to activate a designated application and enable the application to service the contract in the manner specified by the OS. In this way, the manner in which contracts are handled by application code can be managed and coordinated through a centralized application activation component that supports different applications and runtime platforms. In one approach, a runtime platform operates to handle application initialization based on a contract object provided from the OS and passes most of the extension implementation through to the application code itself.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features.

DETAILED DESCRIPTION

Overview

Traditional, uncoordinated approaches to implementing applications within a computing system can create a disjointed "look and feel" that can inhibit users from having an entirely positive user experience with respect to the operating system. Although applications may take advantage of some operating system features, the operating system may have little or no control over how the applications actually implement the features in the traditional approach.

Techniques for application activation are described herein that facilitate integration of applications with an operating system. The operating system (OS) can be configured to incorporate various extension points that are serviceable through associated contracts (e.g., specifications that govern implementation of functionality represented by the extension points) that are formed between the OS and applications. The extensible aspects are defined as integrated functionality provided by the OS and controlled by the OS in a centralized manner. However, the specific implementations of the extensible functionally can be offloaded to applications according to the contracts.

For example, the OS can include or otherwise make use of a centralized application activation component that is exposed by the OS and employs an object-oriented approach to invoke applications to perform particular contracts in a specified manner. During activation the OS can pass information (e.g., a contract object or other suitable data) regarding a particular contract to activate a designated application and enable the application to service the contract in the manner specified by the OS. In this way, handling of contracts by application code can be managed through the centralized application activation component. The result is integration of different applications with the OS to produce a consistent and coordinated user experience for the OS and across different applications and platforms.

In the discussion that follows, a section titled "Operating Environment" is provided and describes one environment in which one or more embodiments can be employed. Following this, a section entitled "Application Activation Techniques" describes example implementation details in accordance with one or more embodiments. Next, a section entitled "Example Methods" describes example methods in accordance with one or more embodiments. Last, a section titled "Example System" describes example computing systems and devices that can be utilized to implement one or more embodiments.

Operating Environment

Figure 1:
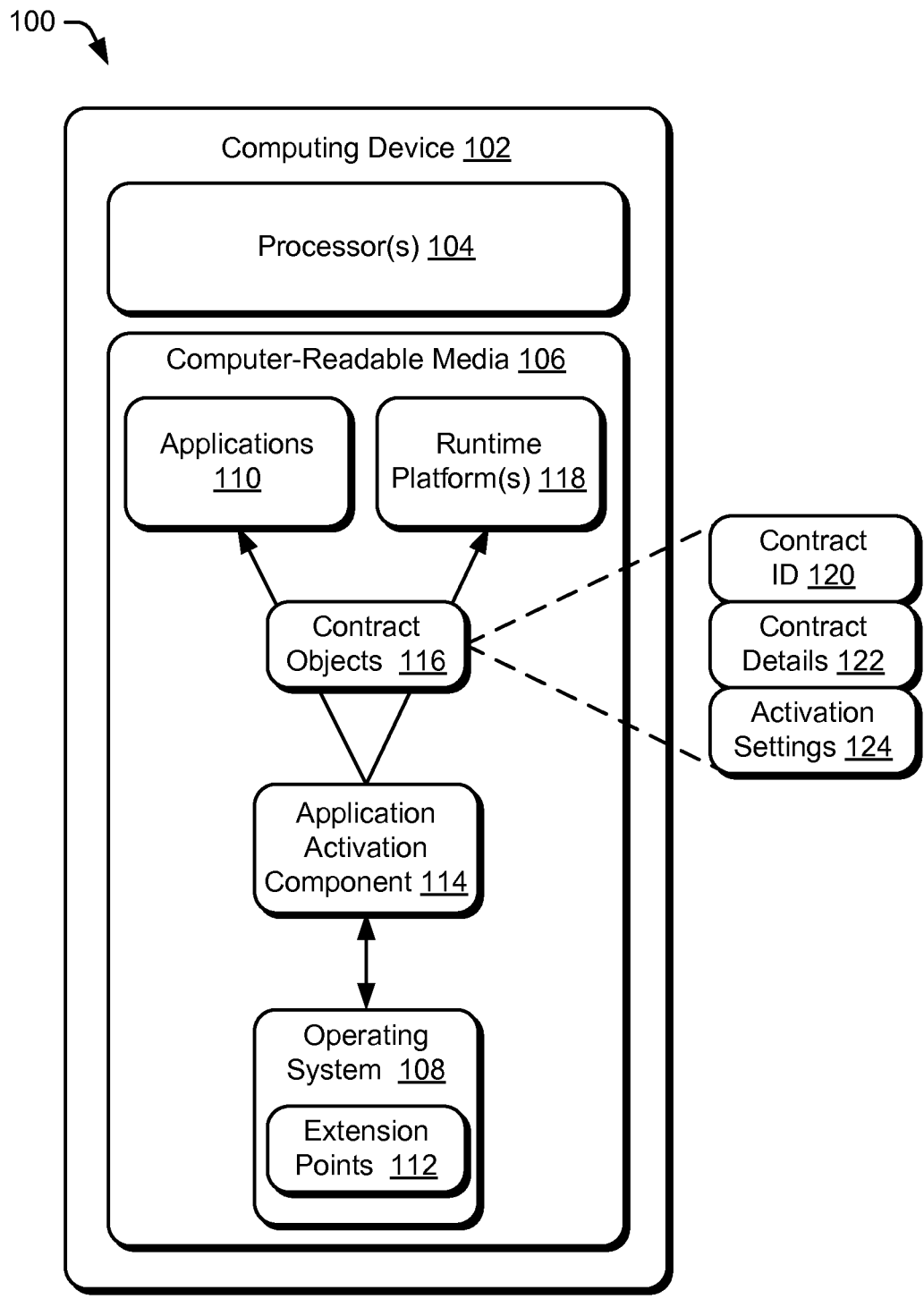
FIG. 1 illustrates an operating environment in which various principles described herein can be employed in accordance with one or more embodiments.

FIG. 1 illustrates an operating environment in accordance with one or more embodiments, generally at 100. The environment 100 includes a computing device 102 having one or more processors 104, one or more computer-readable media 106, an operating system 108, and one or more applications 110 that reside on the computer-readable media and which are executable by the processor(s). The one or more processors 104 may retrieve and execute computer-program instructions from applications 110 to provide a wide range of functionality to the computing device 102, including but not limited to office productivity, email, media management, printing, networking, web-browsing, and so forth. A variety of data and program files related to the applications 110 can also be included, examples of which include office documents, multimedia files, emails, data files, web pages, user profile and/or preference data, and so forth. In general, applications and other program modules can include local applications, web-based applications operable through a host device (e.g., a server or peer device), and/or distributed applications operable through client-server or other multi-device interaction over a network (e.g., "in the cloud").

The computing device 102 can be embodied as any suitable computing system and/or device such as, by way of example and not limitation, a desktop computer, a portable computer, as tablet or slate computer, a handheld computer such as a personal digital assistant (PDA), a cell phone, a set-top box, and the like. One example of a computing system that can represent various systems and/or devices including the computing device 102 is shown and described below in FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

The operating system 108 also includes extension points 112 that represent extensible functionality integrated with the operating system 108. In other words, the extension points provide extensible operating system features that can be implemented by different applications 110 that support individual extension points. The OS defines the set of functionality for the extension points and can offload the implementation to different applications. Extension points 112 can be configured in various ways. By way of example and not limitation, extension points can provide features such as search queries, data sharing between applications, file associations, file streaming, external device operations, media auto play, application launching, website interactions, activation state control, protocol handling, network configuration, hardware/device specific configuration functionality, inter-extension communication, and so forth.

The functionality of the extension points 112 can be implemented by various applications 110 in various ways to effectively integrate some aspects of the applications 110 with the operating system 108. Thus, the extension points represent centralized mechanisms different applications can use and service to extend and coordinate corresponding operating system features through code, interfaces, and particular capabilities of the different applications. Specifications used to govern implementation of functionality represented by the extension points are referred to herein as contracts. Contracts can be created between the OS and applications in response to a request to use extended features. In accordance with the contracts, objects or other suitable data can then be forwarded to an appropriate application that supports the contract/extension point to enable the application to fulfill the contract. In other words, an application that provides an indication to the OS that it supports an extension point can be activated by the OS to handle a contract related to the extension point.

In the manner just described, at least some of the specific details and code for extensible OS functionality can be offloaded to applications that ultimately implement the extensible functionality. Generally speaking the extension points are application and platform agnostic. Accordingly, different types of applications/platforms can be used to implement and service the same extension points Implementation across different types of applications/platforms can occur using a common centralized component through which the OS can direct the different applications/platforms and control the manner in which the applications/platforms service the extension points 112. Thus, although some aspects of extensible functionality is offloaded to servicing applications, the OS maintains control over the functionality and can direct the applications how to perform contracts for the extension points through the centralized component.

In particular, the computing device 102 further includes an application activation component 114 that resides on the computer-readable media and is also executable by the processor(s). The application activation component 114 can be implemented as a standalone application as illustrated or as a component of another application. For example, the application activation component 114 can be provided as an integrated component of the operating system 108.

The application activation component 114 represents a common centralized component that can be exposed by the OS and employed to direct applications 110 with respect to the extension points 112 and associated contracts. In particular, the application activation component 114 can be exposed to register applications to service extension points, select from among the registered applications, and/or invoke applications to fulfill contracts (e.g., particular invocations of extensible OS functionality). The application activation component 114 also enables the OS to maintain control over implementations of extension points 112 by various applications 110. The application activation component 114 can be configured to support many different kinds of applications and/or different runtime platforms 118 of the computing device 102 that provide execution environments for corresponding applications. Examples of runtime platforms 118 for a computing device 102 include JAVA™ runtime environment (JRE), Adobe™ Flash™, Microsoft™.NET framework, and Microsoft Silverlight™ to name a few examples. Supported applications can be run on any suitable runtime platform 118 that is configured to interact with the OS and/or application activation component 114. Once a runtime platform is set-up to enable interaction with the OS and/or application activation component 114, the runtime platform is ready to be used for both existing extension points and future updates to extension points without requiring further revisions of the runtime to support new updates.

In at least some embodiments, the application activation component 114 implements an object-oriented approach to communicate and direct applications with respect to contracts and extension points 112 and/or to otherwise manage extension points provided as part of the operating system 108. For example, when an object-oriented approach is employed, the application activation component 114 can provide or otherwise make use of contract objects 116 to activate and direct applications 110 to fulfill contracts. The object-oriented approach can be used in place of traditional string-based command-line parameters that are cumbersome, difficult to update, and provide relatively rigid and simplistic commands in comparison to richer objects available in the object-oriented approach. For instance, richer objects can provide capabilities that are not possible using command-line parameters, such as providing two-way communications, sourcing data from external processes, and providing brokered objects between applications for shared data access, to name a few examples, The contract objects 116 can be designed according to an expected and consistent communication protocol that is supported by compatible applications. The communication protocol is configured to provide an agnostic, computing language independent way of communicating among different entities and environments that may internally use different computing languages, protocols, and techniques. Compatible applications are able to understand the common format employed for the objects and if appropriate translate the objects to application specific formats appropriate for the particular platform/environment. One example of a suitable protocol that can be employed in some embodiments is Microsoft™ Component Object Model (COM). However, any suitable protocol that enables agnostic, language independent communications among different entities and/or environments can be used to implement the application activation framework described herein.

Contract objects 116 (or other equivalent objects, data, and/or messages) can be communicated directly to applications 110 and/or in some cases through respective runtime platforms 118 corresponding to applications invoked to service a corresponding contract. A contract object 116 can be configured to pass any suitable information regarding a contract to a receiving application. In general, the information passed via contract objects 116 (or otherwise) is configured to activate a designated application and enable the application to service a corresponding contract in the manner specified by the OS. As illustrated in FIG. 1, a contract object 116 can include a contract ID 120 to identify the contract to a receiving application, contract details 122 describing the contours of and/or specific data for the contract, and activation settings 124 used to control how the receiving application activates and/or performs processing to handle the contract. Further details regarding these and other aspects of application activation techniques are described in relation to the following figures.

Having described an example operating environment, consider now example techniques for application activation in accordance with one or more embodiments.

Application Activation Techniques

In accordance with the foregoing, an operating system (OS) can incorporate various extension points that are serviceable through associated contracts. The extensible aspects are defined as integrated functionality of the OS and controlled by the OS in a centralized manner. However, the specific implementations of the extensible functionally can be offloaded to applications through contracts. The handling of the implementation by application code can be managed and coordinated through the centralized application activation component using an object-oriented approach.

Figure 2:
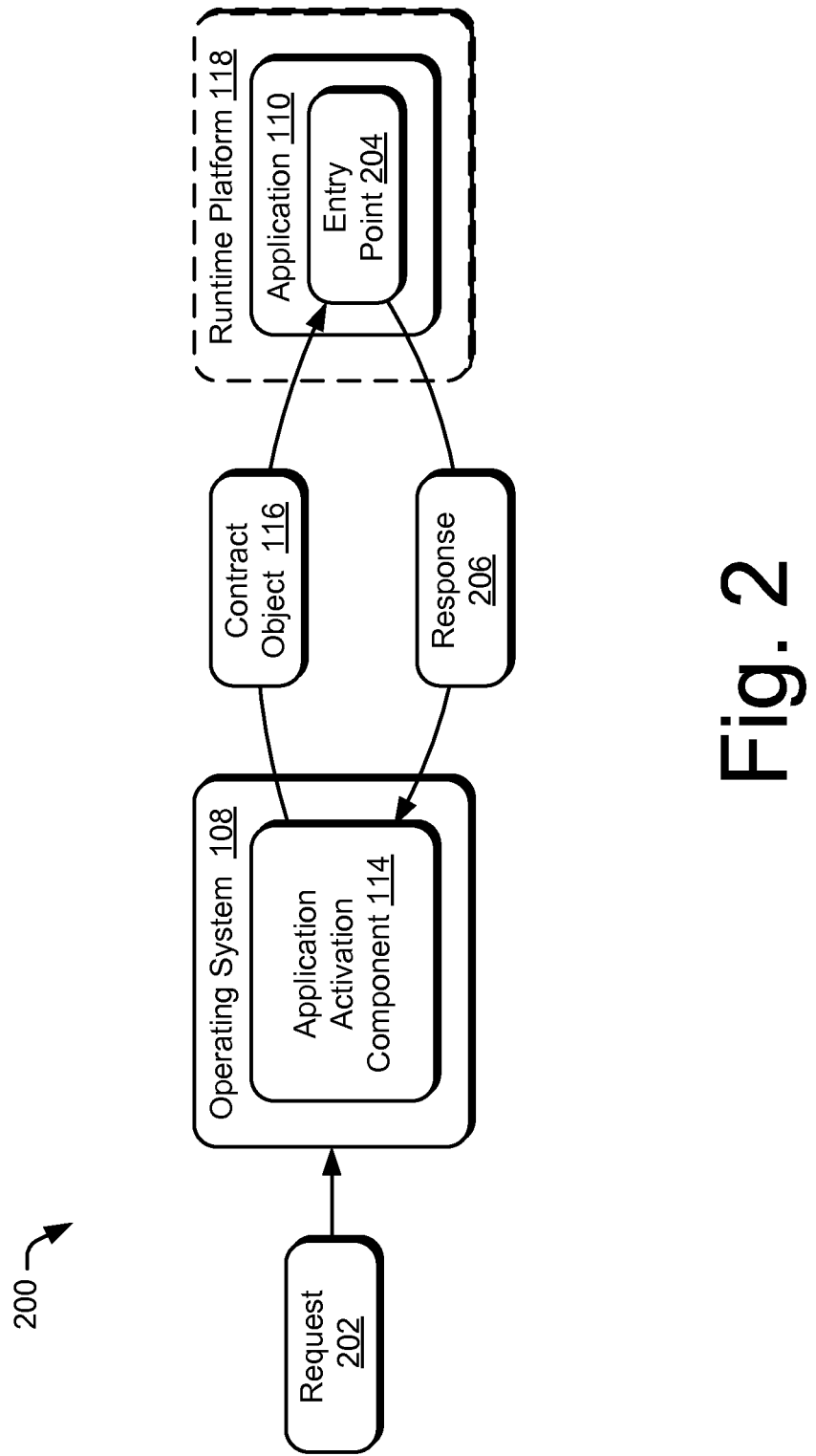
FIG. 2 depicts an example operational scenario for application activation in accordance with one or more embodiments.

Further details regarding application activation techniques are described in relation to an example operational scenario that is depicted in FIG. 2, generally at 200. In particular, FIG. 2 represents some example details regarding an application activation component 114 that can be exposed by an OS to handle application activation. As represented in FIG. 2, an operating system 108 can receive a request 202. The request 202 can be obtained from an entity (e.g., application, device, user, or component) seeking to use functionality provided by an extension point. In other words, the request is a request to access extensible functionality. In this example, the operating system 108 incorporates an application activation component 114 configured to handle the request 202 and otherwise manage extensible functionality provided via the OS. Of course, the application activation component 114 could alternatively be provided as a component separate from the OS as mentioned previously.

In response to the request 202, the application activation component 114 can be configured to select an application to service the request. In one approach, the request can designate a particular application to implement the extensible functionality. In addition or alternatively, a compatible application can be selected from among a group of applications that support the extensible functionality. For example, applications can register with or otherwise notify the OS regarding individual extension points the applications support and can service. Accordingly, the OS can maintain, access, or otherwise make use of a manifest, database, table or other suitable data structure configured to map applications to the different extension points. Based on this mapping, the OS is able to enumerate all of the applications that have indicated capability to service a particular extension point corresponding to a request 202. In at least some embodiments, a list of possible applications to service a request can be exposed to a requestor for selection. In another approach, the application activation component 114 can be configured to select an application on its own (e.g., without the aid of explicit selection by a requestor) using a preference list, default selections, rankings, community feedback and/or other suitable selection criteria. In general, any suitable techniques and/or heuristics, including combinations of the foregoing examples, can be employed to determine which application to activate responsive to the request 202.

In any event, the application activation component 114 identifies and/or selects an application to service the request 202. As represented in FIG. 2, the application may or may not be implemented by way of a corresponding runtime platform 118. The application activation component 114 can operate to activate the selected application to fulfill the request. In particular, the request 202 causes the application activation component 114 to initiate a contract with the application to implement the extensible functionality. For example, the application activation component 114 can create a contract object 116 (or multiple contract objects) for communication to the selected application. One or more contract objects 116 are passed by the application activation component 114 to the appropriate application 110 and provide various information that is used by the application to complete the contract. This information includes the contract ID 120, contract details 122 for the particular contract, and activation settings 124 to control the manner in which the contract is performed, which can be provided as separate objects and/or by way of a single contract object.

More particularly, the contract ID 120 is used to convey to the application the particular contract that is to be performed. As with the extensions points 112, different contracts can be related to different functionality such as search queries, data sharing between applications, file streaming, external device operations, application launching, website interactions, activation state control, and so forth.

The application can use the contract ID 120 to distinguish between different types of contracts and understand how to interpret and process the remaining information that is passed in via the contract object 116. Thus, the application can handle, translate, and/or otherwise process the contract object 116 in different ways depending upon the particular contract that corresponds to the contract object 116 as designated by the contract ID. For instance, identical arguments passed in with contract objects can be interpreted and handled differently depending on the contract ID. In at least some embodiments contracts can be arranged into classes corresponding to different types of contracts. In this case, the contract ID can also be used to convey a contract class corresponding to the contract.

The contract details 122 provide specific information regarding the contract to perform. This can include parameters, links, file names, and other data used to perform the contract. The contract details 122 can also specify particular processing operations to be performed for the contract and/or provide access to methods that can be used to perform the contract. By way of example and not limitation, search query text can be provided in relation to a search contract. In another example, a file path or stream can be provided in relation to a file streaming contract. An output folder location may also be provided. In yet another example, a uniform resource locator (URL) or website address can be provided in relation to a file posting contract. The details for the file posting contract may also specify a reformatting operation, such as to reduce the resolution of pictures before posting the pictures to a share site.

The activation settings 124 include parameters that tell the application how to initialize to fulfill the contract. The activation settings 124 can also specify an existing instance of an application or runtime to use for handling a given contract. Activation settings 124 can be configured to control either or both of an application and/or a runtime platform 118. The activation settings 124 can include presentation aspects, application states, initialization settings, and other settings that specify how to initialize an application into a designated state so that the application can participate in the contract.

For example, the activation settings 124 can include window creation parameters designated to control creation of a window for the application. The window creation parameters passed with a contract object can be used to provide continuity of the look and feel across user interfaces employed by the OS and other applications. In this way, windows for different applications can be coordinated and appear immersively as part of the user interface for the OS or however else the OS chooses to layout, order, and arrange the windows. The window creation parameters can be configured to control timing for creation of an application window, the placement of the window at a selected screen location, and/or visual aspects such as colors, fonts, graphics and so forth. Additionally, the window creation parameters can be used to designate the kind of window to create from among different available options. Options for types of windows can include a full size/standalone window, an embedded or hosted window placed within another application UI, a window for output to an external device, an invisible window (e.g., background process), or a mini-mode window to name a few examples. Thus, window creation parameters enable contract specific control over the UI to designate creation of an appropriate kind of window that is launched in the correct place and has a look and feel that is coordinated with the OS and/or other applications.

In one approach, the activation settings 124 are directed to a runtime platform 118 that receives and uses the settings to activate a corresponding application in an appropriate state as defined by window creation parameters and/or other settings. Other information included in a contract object, such as the contract ID and contract details are passed to the application code itself which handles the actual performance of the contract. In this approach, the runtime platform 118 is involved in application activation primarily to handle tasks related to the application initialization. The runtime platform 118 can perform these tasks without awareness of the contract specifics or extension points provided by the OS. Because the runtime platform 118 is not aware of the extension points, the framework enables development and addition of new extension points that applications can take advantage without changes to the runtime platform 118. Accordingly, new extensions can be deployed and used without modifications of various runtime platforms 118 that may be used by a device. The runtime simply operates to handle the application initialization based on a contract object and passes most of the extension implementation through to the application code itself.

Thus, to activate the application, the application activation component 114 communicates the contract object 116 to an entry point 204 that is designated by the application. The communication can occur directly with the application or through a runtime platform 118 as an intermediary for applications that are implemented in a particular runtime environment. Entry points 204 of applications for various extension points/contracts can be designated when applications register with or otherwise notify the OS to indicate support of individual extension points/contracts. The entry points 204 provide a point of contact for corresponding applications through which the application activation component 114 can interact, invoke, and/or activate the applications.

An entry point can correspond to a particular method, control, form, webpage, and/or other suitable component of an application (or runtime) designed to handle the contract object 116 and/or corresponding contract. The entry point 204 understands the format of the contract object 116 and may handle translation of the object to an application specific form. For example, the entry point 204 can be configured to handle objects, messages, and/or other data that is communicated in accordance with an agnostic, computing language independent protocol employed by the application activation component 114. In particular, a single method of an application that operates on a contract object can be specified as a generic entry point for the application. This acts as a funnel through which the various information conveyed by contract objects 116 is passed into the application. The method tells the application to begin participating in an extension point to fulfill a contract. Thus, one common entry point can be designated for an application that has the capability to perform operations on object-oriented components that then get passed into the application.

When a contract object 116 is received through the entry point, the contract object 116 causes the entry point to activate the application and initiate processing by the application to fulfill a corresponding contract. The processing occurs at the direction of the OS and in the manner specified by the contract object 116 through contract details 122 and/or activation settings 124.

Following the processing, the application can form a response 206 for communication back to the application activation component 114. The response reflects results of performance of the contract by the application including at least an indication of whether or not the contract was successfully completed. Details of these and other aspects of application activation techniques are described in relation to the following example methods.

Example Methods

Figure 3:
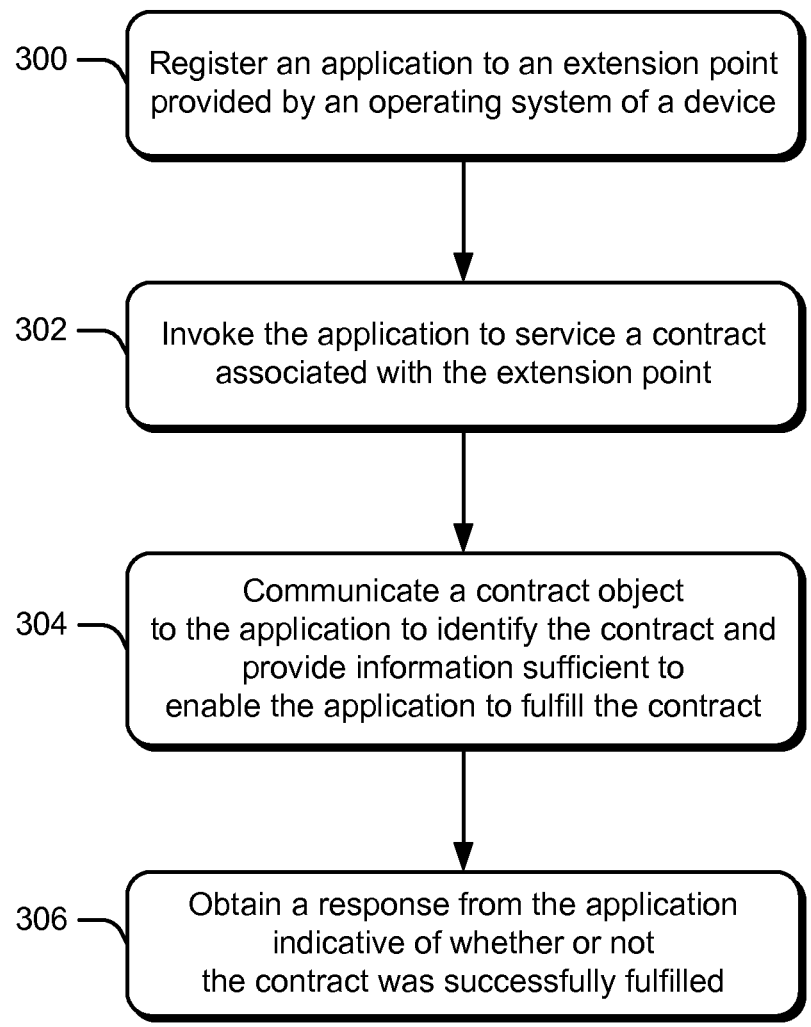
FIG. 3 is a flow diagram that describes steps of an example method in accordance with one or more embodiments.

The following section provides a discussion of flow diagrams that describe techniques for application activation that can be implemented in accordance with one or more embodiments. The example methods described below can be implemented in connection with any suitable hardware, software, firmware, or combination thereof FIG. 3 depicts an example method in which operating system can activate an application to perform a contract associated with an extension point of the operating system. In at least some embodiments, the method can be implemented by way of a suitably configured computing device, such as the example computing device 102 of FIG. 1 that includes or otherwise makes use of an application activation component 114.

Step 300 registers an application to an extension point provided by an operating system of a device. In one approach, applications that support various extension points can be configured to register with the operating system as part of an application installation process. Registration to a particular extension point by an application notifies the OS that the application is configured to service the extension point.

Applications can also provide notifications outside of installation to register with the OS to service designated extension points.

The registration can occur through the application activation component 114 that is exposed by the operating system to provide a common pathway for application activation across different applications and runtime platforms. In particular, the application activation component 114 can assign application identifiers (AppIDs) and maintain a manifest of registrations for different applications. The manifest is configured to match AppIDs to particular extension points on an individual basis. Thus, the manifest maps extension points to different applications that have registered thereby indicating that the applications can service the extension points.

Step 302 invokes the application to service a contract associated with the extension point. For instance, the activation component 114 can be configured to handle a request to access extensible functionality and select an application to service the request. The application activation component 114 can identify a suitable application to service the request by referencing the manifest or other suitable data structure that maps applications to the corresponding extension points. The application activation component 114 can then cause activation of the selected application.

In particular, step 304 communicates a contract object(s) to the application. The contract object identifies the contract and provides information sufficient to enable the application to fulfill the contract. For instance, a contract object 116 can be communicated through an entry point of a corresponding runtime platform 118 that handles initialization of an application 110 based on the object. The runtime platform then sets up an appropriate runtime environment, initializes the application, and passes most of the details for implementation of the extension through to the application. Here, a bifurcated approach is employed that decouples contract implementation and specific code from the runtime platform. The runtime platform handles initialization and the application handles implementation using respective information provided as part of the contract object 116. In this way, the runtime platform need not be aware of the specific details of the extension points, contracts, or implementation. The runtime platform 118 therefore supports the application activation framework, but does not necessarily need to be updated in parallel when additions or modification of extension points are made. Moreover, developers can produce extension points for the framework without concern for updating runtime platforms.

On the other hand, some applications may be designed to handle initialization on their own and/or may be written in bare "to the metal" native code that does not rely upon a runtime platform. In this case, the contract object 116 can be communicated directly to an entry point within the application itself. In this approach, the application can be configured to handle both its own initialization and implementation of the extension according to the contract object 116. Further, an application can be activated to perform a background task by way of a background process and/or invisible window. In this case, window parameters specifying a particular window type may not be passed to the application at all.

In another approach, a runtime platform can be configured to implement select contracts and/or extension points on behalf of applications that the platform handles. This approach can be employed for instance where a particular contract and/or extension point is considered relatively important for applications associated with the runtime platform. For example, if a search contract is deemed appropriate for all applications associated with the runtime platform, the runtime platform can be configured to automatically implement the search contract on behalf of the applications. In this case, the runtime platform can act like an application that is activated to service contracts in the manner described herein.

Once activated, the application can perform processing to fulfill the contract as directed by the operating system. A variety of different processing can occur in connection with different extension points 112. In particular, the contract object 116 can specify a contract ID 120 and contract details 122 that inform the application as to the particular contract and how to handle the contract. The application is therefore able to perform designated processing and communicate results back to the application activation component 114.

In particular, step 306 obtains a response from an application indicative of whether or not the contract was successfully fulfilled. For instance, the application activation component 114 can receive and process a response from an application following processing by the application to perform the contract. The response can be configured to indicate at least the success or failure of the contract. For instance, the response can include a Boolean parameter used to indicate whether or not the application completed the contract successfully. If the contract is not successful, the application activation component 114 can initiate a retry by the same application, terminate the application, initiate error handling for the application, and/or invoke another compatible application to complete the contract if available. If the contract is successful, the OS can take various actions such as notifying a requestor of the success, initiating subsequent contracts that depend on the results, obtaining and/or providing results of the contract to other entities, and so forth.

Figure 4:
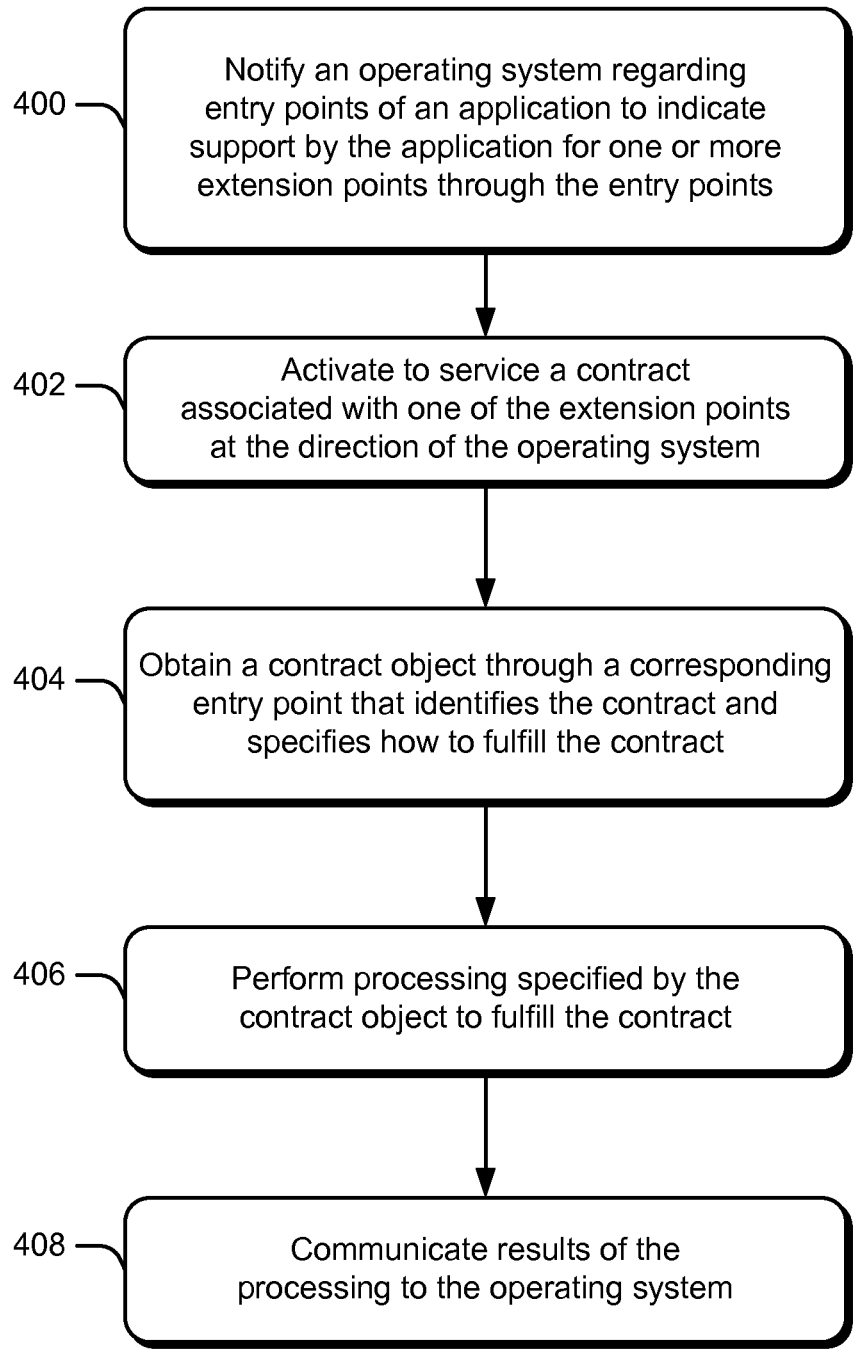
FIG. 4 is a flow diagram that describes steps of another example method in accordance with one or more embodiments.

FIG. 4 depicts another example method in which an application operates to perform a contract associated with an extension point of an operating system. In at least some embodiments, the method can be implemented by way of a suitably configured computing device, such as the example computing device 102 of FIG. 1 that includes or otherwise makes use of various applications 110 and/or corresponding runtime platforms 118 that are compatible with an application activation framework.

Step 400 notifies an operating system regarding entry points of an application to indicate support by the application for one or more extension points through the entry points. This can occur in any suitable way. As noted above, the notification can be provided by an application when the application is installed. Notifications can also be provided at other times outside of installation, such as when a user turns on an optional feature, when a feature is used for the first time, or when an application is executed for the first time. In these cases, the OS may be able to infer the capability and intent of an application to use particular extensions based on context of the interaction. Accordingly, the OS can register the application for the particular extensions. An application can notify the operating system through the application activation component 114 of each extension point 112 that the application can service. The application also provides the operating system with an entry point 204 that serves as the designated point of contact of the application with respect to a corresponding extension point 112. The entry points 204 are configured to handle communications provided by the application activation component 114 to activate the application to service respective extension points. Thus, notifications provided by applications enable the application activation component 114 to update and maintain a manifest mapping applications and their entry points to extension points.

Step 402 activates to service a contract associated with one of the extension points. The activation can occur at the direction of the operating system. In at least some cases, activation can occur through a runtime platform for the application. If an instance of the application is already running the existing instance can be used. Otherwise, a new instance of the application can be created.

Step 404 obtains a contract object through a corresponding entry point. The contract object identifies the contract and specifies how the application is to fulfill the contract as mentioned previously. In particular, a contract object 116 can be received by an entry point that is designated by the application. The entry point can be provided as part of an application itself or by a corresponding runtime platform. The contract object 116 can include activation settings 124 used to initializes the application including setting up of a window as directed by the OS. The contract object also includes a contract ID 120 and a contract details 122 used by the application to implement the extensible functionality.

To fulfill the contract, step 406 performs processing specified by the contract object. Then, step 408 communicates results of the processing to the operating system. For instance, various data parameters provided as part of the contract details 122 can inform the application how to carry out a corresponding contract. This can include specifying such things as processing steps to be performed, file names/locations, URLs or domains for interaction with other parties, data formats, response instructions, methods/objects that can assist in performing the contract, and other information that enables the application to implement the contract. Thus, the application performs the contract to implement extensible functionality in the manner prescribed by the operating system.

When the contract is completed, the application can send a response to the application activation component 114 that includes results of the processing. The results include at least an indication of whether or not the contract was completed successfully. In some scenarios, the results can also include data, files, links, and/or other contract specific information that is generated by fulfillment of the contract. For example, search results could be provided back to the OS for a search extension or converted files could be provided as results of a format conversion extension. The OS can use the results to initiate further processing if appropriate (e.g., invoke applications to perform other contracts) and/or provide the results to a requesting application or device.

It should be noted that in some instances an Application may not send a response back to the OS. For instance, the OS can be configured to poll applications at various times to inquire regarding contract and/or application status in addition to or in lieu of explicit responses. Further, an application that hangs-up may be unable to provide an appropriate response. Thus, having the OS check-up on application status can provide another mechanism by which the OS can keep track of activated applications and corresponding contracts.

Having considered example techniques for application activation, consider a discussion of an example system in accordance with one or more embodiments.

Example System

Figure 5:
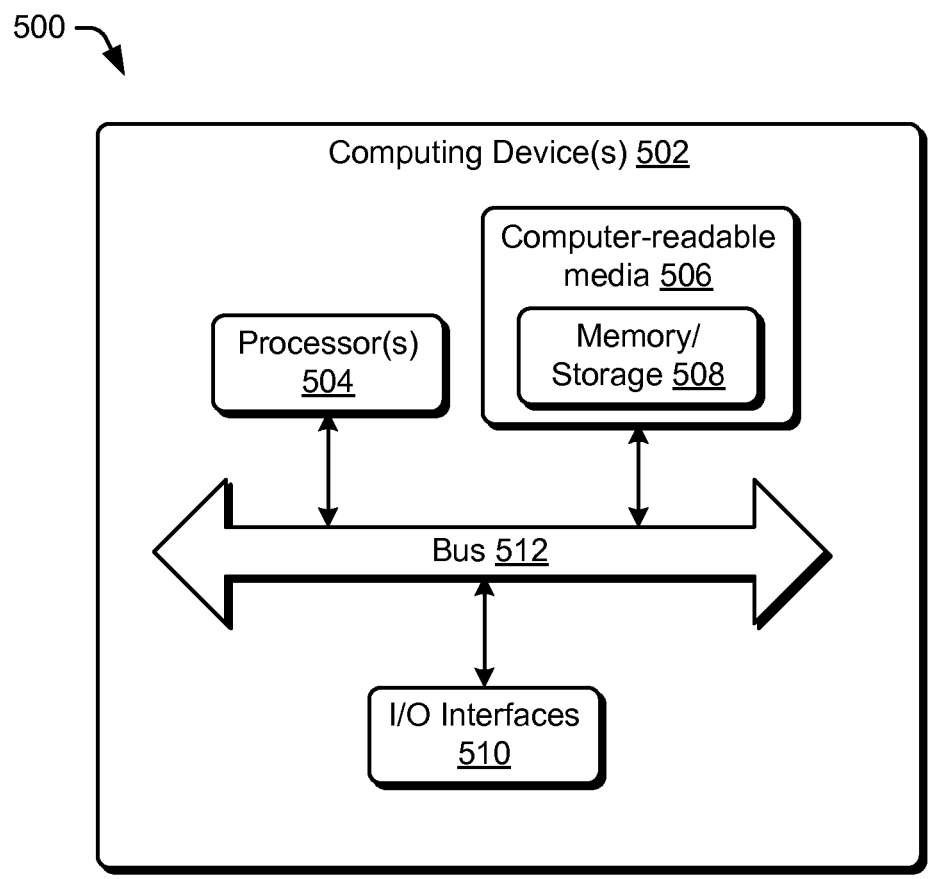
FIG. 5 illustrates an example computing system that can be used to implement one or more embodiments.

FIG. 5 illustrates an example system generally at 500 that includes an example computing device 502 that is representative of one or more such computing systems and/or devices that may implement the various embodiments described above. The computing device 502 may be, for example, a server of a service provider, a device associated with the computing device 102 (e.g., a client device), an on-chip system, and/or any other suitable computing device or computing system.

The example computing device 502 includes one or more processors 504 or processing units, one or more computer-readable media 506 which may include one or more memory and/or storage components 508, one or more input/output (I/O) interfaces 510 for input/output (I/O) devices, and a bus 512 that allows the various components and devices to communicate one to another. Computer-readable media 506 and/or one or more I/O devices may be included as part of, or alternatively may be coupled to, the computing device 502. The bus 512 represents one or more of several types of bus structures, including a memory bus or memory controller, a peripheral bus, an accelerated graphics port, and a processor or local bus using any of a variety of bus architectures. The bus 512 may include wired and/or wireless buses.

The one or more processors 504 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the application activation component 114, operating system 108, applications 110, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 502 may be configured to implement particular instructions and/or functions corresponding to the software and/or hardware modules implemented on computer-readable media. The instructions and/or functions may be executable/operable by one or more articles of manufacture (for example, one or more computing devices 502 and/or processors 504) to implement techniques for application activation, as well as other techniques. Such techniques include, but are not limited to, the example procedures described herein. Thus, computer-readable media may be configured to store or otherwise provide instructions that, when executed by one or more devices described herein, cause various techniques for application activation.

Conclusion

Techniques for application activation have been described herein. In accordance with the foregoing, an operating system (OS) can incorporate various extension points that are serviceable through associated contracts. The extensible aspects are defined as integrated functionality of the OS and controlled by the OS in a centralized manner. However, the specific implementations of the extensible functionally can be offloaded to applications through contracts. The manner in which implementation of the functionality is handled by application code can be managed and coordinated through the centralized application activation component using an object-oriented approach.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
exposing, by an operating system, an application activation component to provide a common pathway for application activation across different applications and runtime platforms of a computing device;
registering, via the application activation component, applications to support extension points provided as integrated functionality of the operating system that are serviceable by the applications through contracts created between the applications and the operating system;
invoking, via the application activation component, an application selected from among the registered applications to perform a particular contract for one said extension point,
wherein the application activation component controls window creation by the applications to service the extension points by passing an object to the application that designates at least a type of window to create and a location for the window.

2. The computer-implemented method of claim 1, wherein the application activation component implements an object-oriented protocol to activate applications to service the extension points as directed by the operating system.

3. The computer-implemented method of claim 1, wherein invoking the application comprises communicating with a runtime platform associated with the application to cause the runtime platform to:
initialize the application; and
pass information to the application sufficient to enable the application to fulfill the particular contract to implement the one said extension point.

4. The computer-implemented method of claim 1, wherein invoking the application comprises communicating directly with the application through a designated entry point of the application corresponding to the one said extension point to cause the application to initialize itself and implement the one said extension point.

5. The computer-implemented method of claim 1, wherein invoking the application comprises communicating a contract object to a designated entry point of the application.

6. The computer-implemented method of claim 5, wherein the contract object comprises activation settings configured to control initialization of the application, a contract identifier to identify the particular contract, and contract details to control implementation of the one said extension point by the application.

7. The computer-implemented method of claim 1, wherein registering the applications occurs in connection with installation of the applications.

8. The computer-implemented method of claim 1, wherein registering the applications comprises:
obtaining notifications from the applications indicating designated entry points for supported extension points; and
updating a manifest to map the designated entry points of the applications to corresponding extension points.

9. The computer-implemented method of claim 1, wherein the application activation component supports multiple different runtime platforms for applications using a platform agnostic, language independent communication protocol.

10. A computer-implemented method comprising:
registering an application to an extension point provided by an operating system of a computing device;
invoking the application to service a contract associated with the extension point;

communicating a contract object to the application to identify the contract and provide information sufficient to enable the application to fulfill the contract;

obtaining a response from the application indicative of whether or not the contract was successfully fulfilled;

responsive to ascertaining from the response that the contract was not successfully fulfilled, initiating a retry of the contract; and responsive to ascertaining from the response that the contract was successfully fulfilled, providing a notification of the contract's success, wherein the contract specifies a particular invocation of functionality represented by the extension point that is to be implemented by the application under the control of the operating system.

11. The computer-implemented method of claim 10, wherein the contract object is configured according to a platform agnostic, language independent communication protocol compatible with multiple runtime platforms of the computing device.

12. The computer-implemented method of claim 10, further comprising selecting the application to service the contract from among multiple applications registered to the extension point by reference to a manifest that maps applications to different extension points supported by the applications.

13. The computer-implemented method of claim 10, wherein the contract object includes window creation parameters to control creation of a window for the application to service the contract, the window creation parameters including parameters to designate timing for creation of the window, the placement of the window, and visual aspects of the window.

14. A system, comprising:

a computing device comprising one or more processors;

computer-readable storage media storing computer-executable instructions that are executable by the one or more processors to cause the system to perform operations comprising:

responsive to receiving a request to use extensible functionality provided by an extension point of an operating system of the computing device, selecting an application to service the request;

creating one or more contract objects, the one or more contract objects comprising activation parameters that specify how to initialize the application to service the request;

communicating the one or more contract objects to an entry point of the application to service the request, the communicating occurring directly with the application rather than with a runtime platform associated with the application and causing the application to initialize itself;

polling the application for information regarding the status of one or more of the request or the application; and obtaining a response from the application indicative of whether or not the request was successfully fulfilled.

15. The system of claim 14, wherein the one or more contract objects further comprise a contract identifier to identify the request and window creation parameters to control creation of a window for the application to service the request, the window creation parameters including parameters to designate timing for creation of the window, the placement of the window, and visual aspects of the window.

16. The system of claim 14, wherein selecting the application to service the request comprises:

selecting, if the request designates a particular application, the particular application; and selecting, if the request does not designate a particular application, an application according to selection criteria comprising a preference list, default selections, rankings, and community feedback.

17. The system of claim 14, wherein selecting the application comprises selecting, from a manifest that maps applications to different extension points, an application from among multiple applications registered to the extension point.

* * * * *